United States Patent [19]
Yamakado

[11] Patent Number: 5,835,539
[45] Date of Patent: Nov. 10, 1998

[54] FSK MODULATOR

[75] Inventor: Shinji Yamakado, Tokyo, Japan

[73] Assignee: NEC Corporation, Tokyo, Japan

[21] Appl. No.: 798,767

[22] Filed: Feb. 11, 1997

[30] Foreign Application Priority Data

Feb. 16, 1996 [JP] Japan .................................... 8-029676

[51] Int. Cl.⁶ ................................................ H03C 3/00
[52] U.S. Cl. .......................................... 375/303; 332/101
[58] Field of Search ................................ 331/1 R, 23, 30; 332/100, 119, 127, 128; 375/303, 306, 334

[56] References Cited

U.S. PATENT DOCUMENTS

| | | | |
|---|---|---|---|
| 4,567,603 | 1/1986 | Howell et al. ........................... | 375/303 |
| 4,670,888 | 6/1987 | Smith, III .............................. | 375/303 |
| 5,706,310 | 1/1998 | Wang et al. ............................ | 375/303 |

*Primary Examiner*—Stephen Chin
*Assistant Examiner*—Joseph Roundtree
*Attorney, Agent, or Firm*—Young & Thompson

[57] ABSTRACT

The FSK modulator for modulating binary data of the present invention has an object to provide an FSK modulator which can operate at a stable frequency also when a discontinuous data row is entered. The FSK modulator comprises a PLL (phase locked loop) in which binary data is entered at two types of voltage levels different each other, an oscillation output of the PLL treated as output data of the modulator, allows a voltage at an almost-intermediate level to the PLL instead of binary data when the binary data has not been entered.

5 Claims, 5 Drawing Sheets

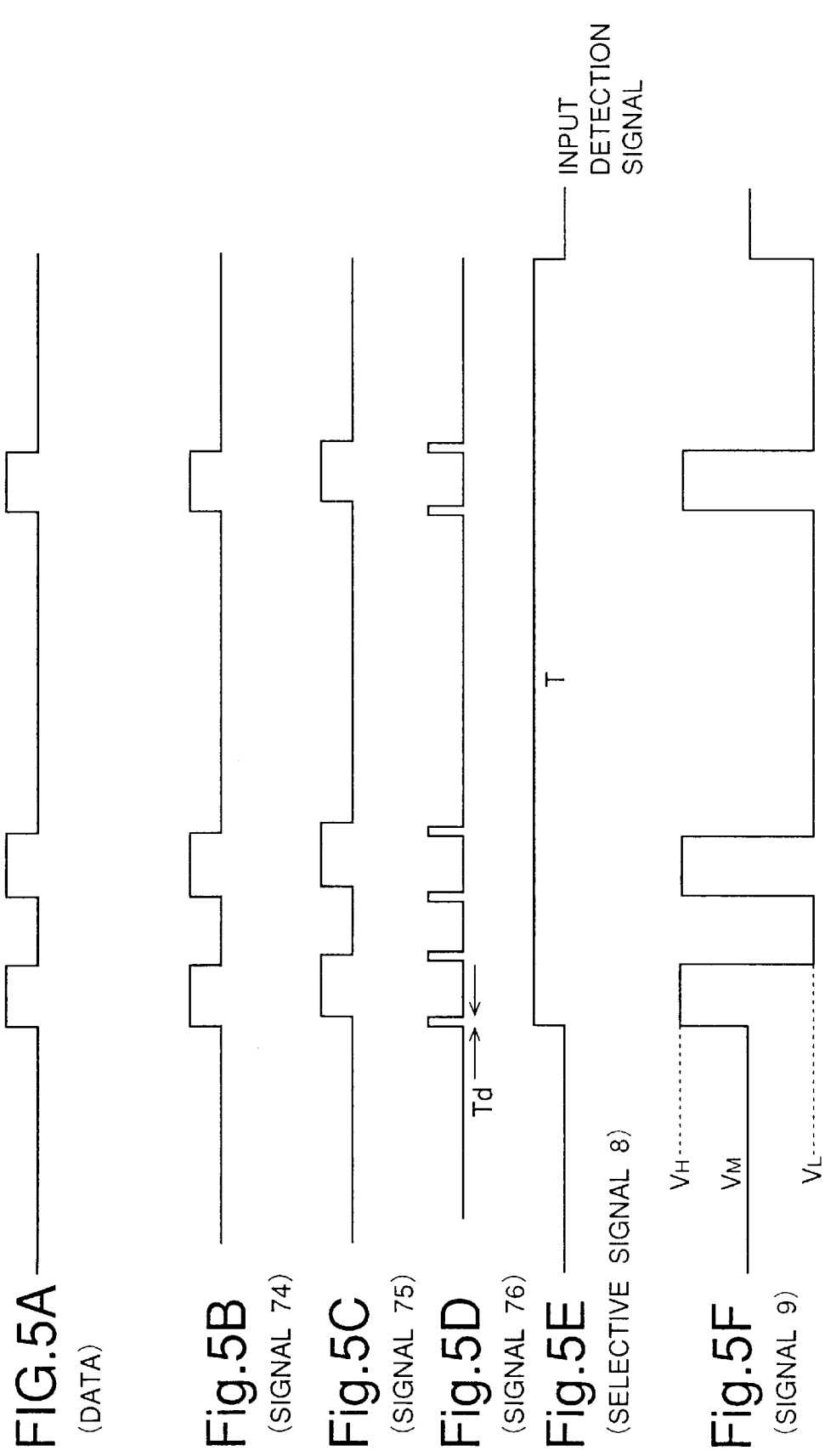

FSK MODULATOR

BACKGROUND OF THE INVENTION

1. Field of the Invention

The present invention relates to an FSK modulator, and more particularly to an FSK modulator for modulating a discontinuous data row in a frequency shift keying (FSK) system.

2. Related Background Art

A conventional FSK modulator will be described below referring to FIG. 1. As shown in this drawing, the conventional FSK modulator comprises a voltage controlled oscillator (hereinafter, VCO) 1 including an oscillating section 11 and a variable capacitance diode 12, a frequency divider 2 for dividing the oscillation output, a mixer 3 for synthesizing frequency of the divided output with that of a reference wave signal 30, a low pass filter (LF) 4 for removing high-frequency components of this output, and a phase locked loop (hereinafter, PLL) for providing a feedback of the removed output to the VCO1. Into this PLL, input data is directly entered for modulation. It is assumed, however, that input data (DATA) 10 is no-return-zero (NRZ). In addition, it is assumed that a data row of the input data 10 is temporarily at a 0 [V] or 1 [V] signal level.

In this configuration, the frequency of the reference wave signal 30 which is an output of a reference signal generator which is not shown is synthesized with that of a divided output of the frequency divider 2 by means of the mixer 3 so as to output a desired frequency F0. The VCO1 detects an output of the mixer 3 and converts it to a voltage so as to synthesize it with a voltage level (0 [V] or 1 [V]) of a data row. An output frequency of the VCO1 becomes a frequency F1 (F1=F0−Fm) when a voltage level of a data row is at level 0 [V] and it becomes a frequency F2 (F2=F0=Fm) when it is at level 1 [V], so that there is a difference of 2Fm between these frequencies. As described above, the FSK modulation is achieved by shifting a frequency from the intermediate frequency F0 by ±Fm.

In the above conventional FSK modulator, if a data row of the input data 10 is continuous, a frequency is modified by ±Fm with giving control voltages VL or VH corresponding to "0" or "1" and therefore an oscillation frequency becomes F1 or F2. In other words, if data is continuous, the VCO1 operates so that the frequency moves by +2Fm in a process of a 0-to-1 data change and operates so that the frequency moves by −2Fm in a process of a 1-to-0 data change. Accordingly, as far as data is continuous, the VCO1 normally outputs the frequencies F1 and F2.

If a non-signal state of the input data 10 continues for some time, an oscillation frequency of the VCO1 converges to a frequency F0 with the operation of the PLL. In this state, for a discontinuous signal like one in a packet communication, the VCO1 operates so that the frequency moves by +2Fm when the beginning portion of data does not begin with the frequency F1, but with the frequency F0 and data shifts from 0 to 1. Then, the frequency changes to F3 (F3=F0+2Fm) and a few bits of the beginning portion have incorrect frequencies.

These operations are described below referring to FIG. 2.

It is assumed that data shown in FIG. 2A is entered in a condition that the oscillation frequency converges to F0. In this case, as shown in FIG. 2B, the oscillation frequency of the VCO1 changes from F0 to F3 or from F3 to F0.

FIG. 2C shows the changes which are represented by a frequency spectrum. As shown in this drawing, even if data is entered again after a non-signal state has continued, a change indicated by an arrow (2) is repeated for some time instead of a change indicated by an arrow (1). Therefore, in a case that this change is repeated, it is impossible to transmit an original oscillation frequency F1 which is achieved when data is zero (0).

As described in the above, the conventional modulator has a disadvantage that a data row cannot be correctly regenerated in the opposing reception side until the frequencies are stabilized to F1 or F2 indicated by an arrow (3) with the PLL operation after several bits if data is entered after a non-signal state has been continued.

SUMMARY OF THE INVENTION

The present invention is provided to solve the above-described disadvantages of the conventional technique, and it is an object of the invention to provide an FSK modulator which can operate at a stable frequency also when a discontinuous data row is entered.

The FSK modulator of the present invention includes a PLL in which binary data is entered at two types of voltage levels (high level and low level) different each other, an oscillation output of the PLL treated as output data of the FSK modulator, characterized by an intermediate voltage input means for allowing to enter voltages at the two types of almost-intermediate levels to the PLL instead of the binary data when the binary data has not been entered.

BRIEF DESCRIPTION OF THE DRAWINGS

The features and advantages of the present invention will become more clearly appreciated from the following description to be read in conjunction with the accompanying drawings, in which like circuit blocks are denoted by like reference numerals, and also in which:

FIG. 2 shows wave form charts illustrating an operation of the FSK modulator in FIG. 1, where

FIG. 4 shows wave form charts illustrating an operation of the FSK modulator in FIG. 3, where FIG. 5 is a diagram illustrating wave forms of respective portions of a selective signal generator 7, where FIGS. 5A and 5B show data wave forms to be entered, FIG. 5C shows a wave form of a delayed signal 75, FIG. 5D shows an output wave form of an exclusive-OR, FIG. 5E is a diagram illustrating a selective signal 8, and FIG. 5F is a diagram illustrating an output signal of a selector switch 6.

DETAILED DESCRIPTION OF THE PREFERRED EMBODIMENTS

An FSK modulator, which comprises a PLL in which binary data is entered at two types of voltage levels different each other, an oscillation output of the PLL treated as output data of the FSK modulator, allows a voltage at an almost-intermediate level to the PLL instead of binary data when the binary data has not been entered.

This invention will be described below by using the accompanying drawings.

Figure 1:
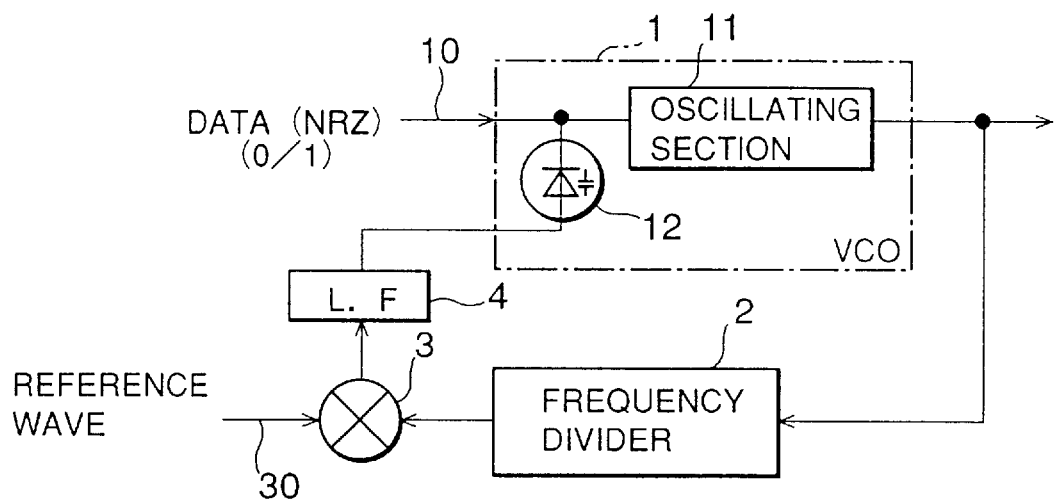
FIG. 1 is a block diagram illustrating a configuration of a conventional FSK modulator.
Figure 2A:
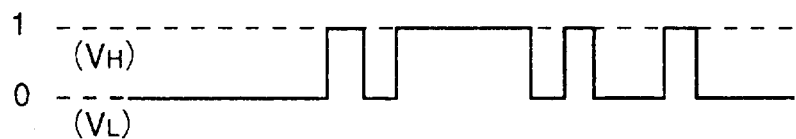
FIG. 2A shows an example of data to be entered.
Figure 2B:
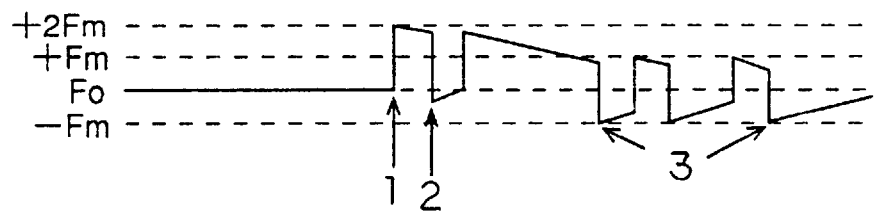
FIG. 2B shows characteristics of output frequencies of the modulator.
Figure 2C:
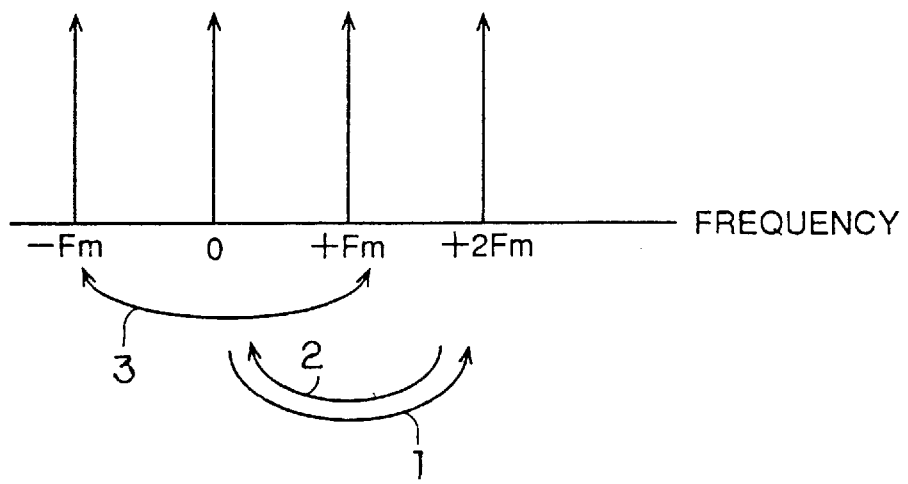
FIG. 2C shows an output frequency spectrum of the modulator.
Figure 3:
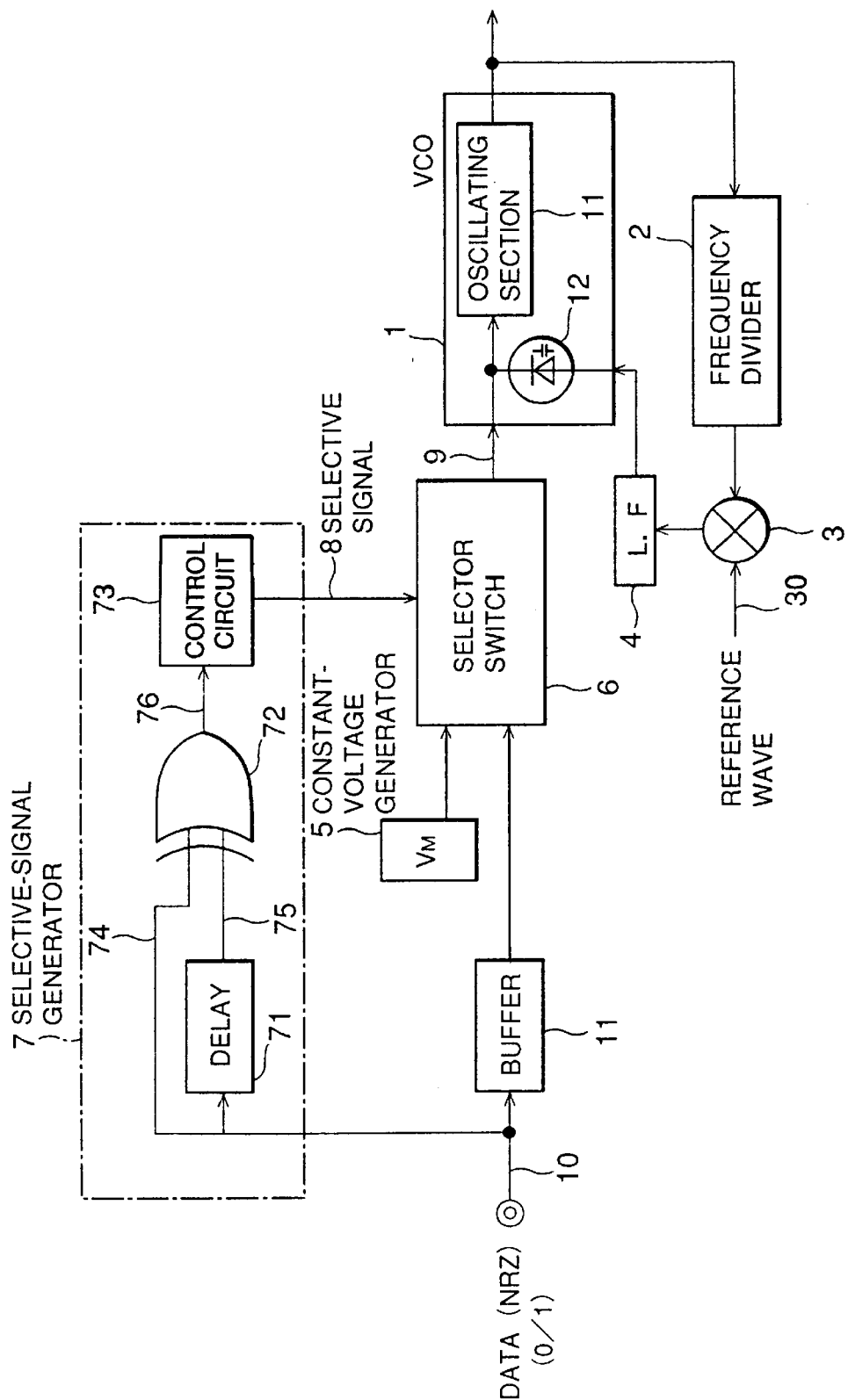
FIG. 3 is a block diagram illustrating a configuration of the FSK modulator according to an embodiment of the present invention.

FIG. 3 is a block diagram illustrating a configuration of an embodiment of an FSK modulator of the present invention, wherein like reference characters designate corresponding parts in FIG. 1. In this drawing, an FSK modulator of the embodiment of the present invention differs from the circuit in FIG. 1 in that it includes a constant-voltage generator 5, a selector switch 6 for allowing an output of the constant-voltage generator 5 and input data 10 to be entered to the VCO1 selectively on the basis of a control of a selective signal 8, and a selective signal generator 7 for generating the selective signal 8. In other words, in this configuration, the input data 10 is entered into the selective signal generator 7 so as to detect a non-signal state of the input data. The selective signal generator 7 outputs the selective signal 8 in a non-signal state to switch the selector switch 6 to an output of the constant-voltage generator 5. As a result, a voltage VM at an intermediate level between a control voltage VL and a control voltage VH is generated by the constant-voltage generator 5 and then an output VM of the constant-voltage generator 5 is entered into the VCO1 instead of the input data 10 in a non-signal state.

Figure 4A:
FIG. 4A shows a data wave form to be entered.

In this embodiment, it is assumed that a voltage level of the control voltage VL is 0 [V] and that of the control voltage VH is 5 [V] and that the constant-voltage generator 5 transmits +2.5 [V] which is a voltage at an intermediate level between them as the voltage level VM. In other words, the voltage level VM is obtained by means of an equation, VM=(VL+VH)/2. Further, a voltage level of a selective signal 8 is assumed to be H (high) when there is a signal of the input data 10 or L when there is no signal, that is, in a non-signal state. In other words, for input data as shown in FIG. 4A, a voltage level of the selective signal 8 is L (low) in a non-signal state or H in a state that there is a signal of the input data 10 as shown in FIG. 4B.

Figure 4B:
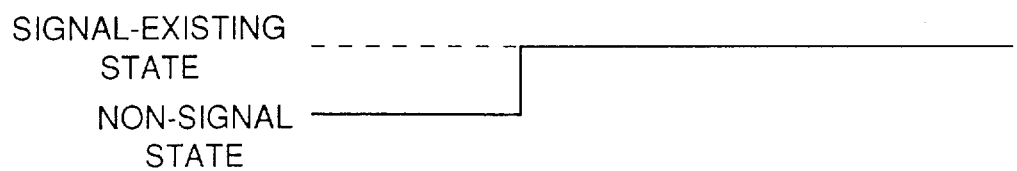
FIG. 4B shows a wave form of a selective signal.
Figure 4C:
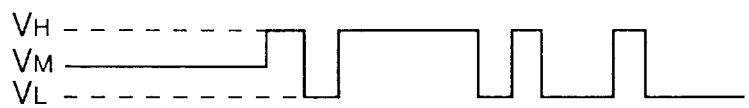
FIG. 4C shows an output wave form of a selector switch 6.

Accordingly, as shown in FIG. 4C, an output of the selector switch 6 in a period corresponding to the non-signal state in FIG. 4B is a constant voltage level VM. On the other hand, an output of the selector switch 6 in a state that there is a signal in FIG. 4B is identical with the input data shown in FIG. 4A.

Figure 4D:
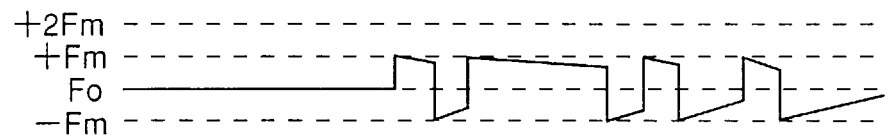
FIG. 4D shows characteristics of output frequencies of the modulator.

As described above, with giving a voltage level VM at an intermediate level in a non-signal state, an output of the selector switch 6 shifts from VM to VH and VH to VL even if input data changes from 0 to 1 and 1 to 0 from the non-signal state. As a result, the frequency does not shift by +2Fm, but by +Fm, and therefore as shown in FIG. 4D, the oscillation frequency of the VCO1 shifts from F0 to F2 and F2 to F1, so that a correct frequency can be output from the beginning of data.

If an enable signal indicating an effectiveness of data is entered in parallel with the input data 10, the enable signal can be used as a selective signal 8.

In other words, in this FSK modulator, with setting an input voltage of the VCO 1 to an intermediate level between the levels L and H in a non-signal state of a discontinuous data row, an output frequency can be changed to F1 or F2 from the beginning portion of data if data is entered again.

Next, a configuration of the selective signal generator 7 is described below. FIG. 3 shows an example of the selective signal generator 7. Referring to FIG. 5, this generator is explained. In other words, an input data signal 10 is directly entered as one input signal 74 of an exclusive-OR 72 (FIG. 5B). As the other input signal 75, an input data signal is entered via a delay circuit 71 for delaying an input data signal by a certain time (FIG. 5C). When these input signals pass through the exclusive-OR circuit 72, pulses are generated as shown in FIG. 5D in logical inconsistent portions between the wave forms shown in FIGS. 5B and 5C. Then, the control circuit 73 starts counting at a rise of each pulse signal of an output of the exclusive-OR circuit 72 for a time period T by means of a timer circuit. This time period T is assumed to be slightly longer than a previously-known data continuation time. After that, a selective signal 8 is output with controlling the signal so that it is at the H level only for the above time period T (FIG. 5E). As a result, since the selective signal 8 is entered into the selector switch 6 so that there is no signal in periods other than the timer time period T, the selector switch is switched to an output of the constant-voltage generator 5 for the corresponding periods and then data is entered into the VCO1. In the timer time period T, the input data 10 is directly entered into the VCO1. In addition, as for another circuit, an equivalent function can be obtained by using a monostable multivibrator for generating pulse signals only for the time period T by means of a rise of each data signal for the selective signal generator 7. Although this invention has been described in this preferred embodiment with a voltage of the constant-voltage generator 5 assumed to be the voltage VM at an intermediate level between the levels of the control voltages VL and VH, a deviation from the VM level may stabilize the frequencies at a high speed in some cases depending on input conditions of the VCO1. Therefore, it is also possible to set the voltage of the constant-voltage generator 5 being deviated from the voltage VM at the intermediate level between the control voltages VL and VH.

As described above, the present invention has an effect that, if data is entered again when binary data has not been entered, a stable output frequency is obtained from the beginning portion of the data by entering a voltage at almost-intermediate level into the PLL instead of the binary data.

What is claimed is:

1. An FSK modulator for modulating binary data in the FSK system as an input signal, comprising:

a selective signal generation means for generating a selective signal with detecting a presence or absence of said binary data;

a switching means for switching said selective signal which has been received to either said binary data or a predetermined voltage; and a phase locked loop (PLL) means for entering an output of said switching means for the FSK modulation.

2. An FSK modulator according to claim 1, wherein the predetermined voltage is an almost-intermediate voltage between a high level voltage and a low level voltage of said binary data different each other.

3. An FSK modulator according to claim 1, wherein the switching means selects the almost-intermediate voltage out of the high level voltage and the low level voltage of said binary data different each other if said input signal is absent or selects said binary data if said input signal is present.

4. An FSK modulator according to claim 1, wherein the selective signal is obtained by detecting a rise of each data of said input signal and generating pulses continuing for a predetermined time period.

5. An FSK modulator according to claim 1, wherein the PLL comprises an oscillating section for varying an oscillation frequency according to a capacity variation of a variable capacitance diode, a frequency divider for dividing an oscillation output of said oscillating section, a mixer for synthesizing frequency of said divided output with that of a reference wave signal, a low pass filter for removing high-frequency components of an output from said mixer, and said variable capacitance diode for entering an output from said low pass filter, and directly enters an output voltage of said selector switch to said variable capacitance diode.

\* \* \* \* \*